May 14, 1940.   H. T. HALLOWELL   2,201,087
SELF-LOCKING SETSCREW
Filed April 28, 1938

Inventor
Howard T. Hallowell
by his Attorneys.
Howson & Howson

Patented May 14, 1940

2,201,087

UNITED STATES PATENT OFFICE 2,201,087

SELF-LOCKING SETSCREW

Howard T. Hallowell, Jenkintown, Pa., assignor to Standard Pressed Steel Co., Jenkintown, Pa., a corporation of Pennsylvania Application April 28, 1938, Serial No. 204,870

8 Claims. (Cl. 151—37)

A principal object of this invention is to provide a self-locking setscrew of substantially improved characteristics.

More specifically, an object of the invention is to provide a setscrew having novel and improved means for locking the screw securely in the work, said lock being in effect substantially permanent as regards its resistance to loosening of the screw from vibration or other accidental causes, while offering no undue resistance to intentional release of the screw in or from the work.

Another object is to provide a self-locking setscrew wherein the locking means is of a character to remain functionally unimpaired after long use of the screw and in spite of repeated removals and reapplications of the latter from and to the work.

Still another object is to provide a setscrew having self-locking means of a character precluding any essential damage to or marring of the work parts to which it may be applied.

A still further object is to provide an efficient self-locking setscrew that may be produced at only slightly increased expense over the conventional screws lacking the self-locking feature.

In the very nature of their primary function, setscrews are difficult to lock in place and are subject to accidental loosening by vibration and other causes. The conventional screw is held against loosening entirely by friction between its own threads and those of the member in which it is threaded and between the tip or working end of the screw and the member which the tip engages. The screw remains tight only as long as the original setting is maintained, and any recession, no matter how slight, from that position results inevitably in a substantial reduction in the retaining friction and a consequent relatively rapid loosening of the screw. Furthermore, the amount of friction between the threads is dependent in large degree upon the force or pressure with which the tip of the screw bears against the work, and if for any reason this pressure is decreased, say, for example, by slippage or by shrinkage of the parts, the retaining friction is again reduced and the eventual loosening of the screw is inevitable.

In order to improve the efficiency of setscrews, it is customary to form their tips or working ends in a form such that they are capable to some extent of biting into the work against which they are forced. These tips, however, are of a character primarily to preclude slipping of the member with respect to the tip and have little or no tendency to prevent the screw from turning on its axis. Thus, it is common practice to give the tip a tapered or frusto-conical formation and to recess the extremity so as to provide at the tip a relatively sharp annular work-engaging edge concentric with the axis. This general formation is shown in the attached drawing. I have discovered that by a simple knurling operation which modifies the form of the tip, as hereinafter described, it is possible to confer upon screws of this class highly effective self-locking characteristics.

The invention will be more readily understood from the attached drawing, in which.

Figure 1:
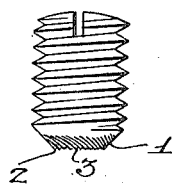
Figure 1 is a side view of a setscrew made in accordance with my invention.

In the practice of my invention, I prefer to employ a tip of the conventional frusto-conical and recessed form, as illustrated in the drawings. In accordance with the invention, I knurl the outer conical surface of the tip, as shown for example at 1 in Fig. 1, with the result that the normally smooth annular edge at the extremity of the tip is modified structurally and exhibits a series of small peculiarly shaped projections or teeth 3. The edge formation resulting from the knurling operation is entirely characteristic and is highly effective for the intended function hereinafter described.

When the setscrew is tightened in the work so that the edge 2 is forced solidly against the work in the usual manner, the setscrew by reason of the peculiar formation of the annular edge becomes securely anchored or locked in position. This effect is apparently due to the fact that the small projections or teeth penetrate or locally depress the surface of the opposed work and form with the latter a substantially positive interlock whereby the tip of the screw in effect becomes geared to the opposed work member. By preventing the screw from turning about its axis, this mechanical interlock positively precludes loosening of the screw, and in addition precludes the possibility of slippage between the screw and the work member against which the serrated tip has been forced. It is to be noted that this substantially positive interlocking of the screw tip with the opposed work which resists loosening of the screw is in addition to the normal frictional binding of the screw with the opposed threads of the member in which it is threaded, so that the self-binding or self-locking effect is cumulative. Since the screw is to a definite positive degree prevented from turning on its axis, and since further the tip of the screw is in effect geared to the opposed work element so that slippage between these parts is prohibited, there is no opportunity for the minute initial loosening of the screw by vibration or other accidental cause, which as set forth above is responsible in the conventional screw for subsequent relatively rapid loosening of the screw in the work. Furthermore since in effect the small teeth or projections of the tip are embedded in the opposed work member, any slight retraction of the tip from that member by reason of shrinkage of the parts does not, as in the conventional screw, permit the screw to turn on its axis, so that loosening from this cause is also precluded.

An important feature of the invention, which appears to be a function of the peculiar formation effected by the knurling operation, resides in the fact that the efficiency of the device is not materially affected by u e and will remain substantially unimpaired over long periods during which the screw may be repeatedly removed from and replaced in the work.

Figure 2:
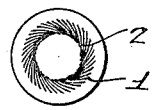
Fig. 2 is an end view of the screw shown in Fig. 1.

In a preferred embodiment of my invention, as shown in Figs. 1 and 2, I form the knurls in the screw tip on a bias with respect to the axis of the setscrew, and preferably the knurls are so arranged with respect to the screw threads that the ends of the knurls relatively remote to the tip will lead the other ends when the screw is being turned into the work. Thus, with a right hand thread and when viewed from the side as in Fig. 1, the knurls will slant upwardly to the left from the working tip. This form of knurl has been found particularly effective to the desired end.

Figure 3:
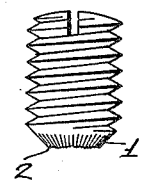
Fig. 3 is a side view of a setscrew illustrating a modification within the scope of the invention.
Figure 4:
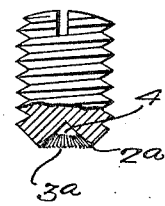
Fig. 4 is a side and partial sectional view of a setscrew illustrating a further modification.

While the character of knurl shown in Figs. 1 and 2 is preferred, others have been found highly effective in producing the desired locking action. In Fig. 3, for example, each individual knurl lies in a plane through the axis of the screw. In Fig. 4, I have illustrated a further modification wherein the knurls are applied to the surface of the countersunk recess 4 in the tip of the screw instead of to the outer conical surface of the tip as in the aforedescribed embodiments. In this case, as in the other embodiments, the edge 2a of the tip is provided with the characteristic fine toothed formation, as indicated at 3a.

Screws made in accordance with my invention and subjected to vibrations of a character that caused loosening of the conventional setscrew in a relatively few minutes have remained locked in position over indefinite periods of time. One material advantage of the device resides in the fact that the locking means being entirely disassociated from the threads of the screw and located solely at the working tip is of a character preclusive of any essential damage to or undesirable marring of the work parts to which the screw is applied. The ribs produced by knurling are not of a character to cut or ream the work metal, and the tip functions in substantially the same manner as the tip of the conventional setscrew to embed itself in the work not by cutting but by upsetting the work metal within the area immediately engaged by the tip. The work metal upset in this manner is pressed into the recesses or channels between the ribs, and thus interlocks the tip with the work. Another great advantage, previously set forth, resides in the fact that the locking means remains functionally unimpaired even after extended periods of use during which the screw may be repeatedly removed and replaced in the work. A further highly important advantage of the invention resides in the simplicity of the device and in the fact that it may be produced without undue increase over the expense of manufacturing the conventional setscrew lacking the self-locking feature.

Figure 5:
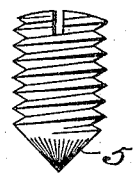
Fig. 5 is a side view of a somewhat different form of setscrew made in accordance with the invention.

The invention in principle may be applicable to other forms of setscrew than that shown in Figs. 1 to 4, such for example as the screw illustrated in Fig. 5. In this case, the tapered tip 5 of the screw is carried out to a point and the conical surface of the tip is provided with the typical small knurls. There may be other modifications without departure from the principle of the invention as defined in the appended claims.

I claim:

1. A self-locking setscrew having an axially disposed cavity in the working tip, said cavity having inwardly convergent walls defining the inner face of a terminal rib adapted when the screw is turned home to embed itself in the work, said inner face having a series of small recesses arranged in proximity to the extremity of the tip into which the metal of the work is compressed when the screw is tightened to thereby interlock the screw with the work.

2. A self-locking setscrew having an axially disposed cavity in the working tip, said cavity having inwardly convergent walls defining the inner side face of a terminal rib adapted when the screw is turned home to embed itself in the work, said inner face being formed to provide therein a circumferential series of small channels arranged so as to intersect a plane normal to the longitudinal axis of the screw.

3. A self-locking setscrew having an axially disposed cavity in the working tip, said cavity having inwardly convergent walls defining the inner side face of a terminal rib adapted when the screw is turned home to embed itself in the work, said inner face being formed to provide therein a circumferential series of small channels intersecting a terminal edge of said rib.

4. A self-locking setscrew having a working tip adapted when the screw is turned home to upset the work metal and to thereby embed itself in the work, a side surface of said tip being formed so as to provide in proximity to the extremity of said tip a circumferential series of small channels each extending in a direction to intersect a cross sectional plane normal to the longitudinal axis of the screw and adapted to receive the said upset work metal to establish an interlock between the work and said tip, the peripheral portions of the tip separating said channels being substantially non-cutting with respect to the work.

5. A self-locking setscrew having a frusto-conical working tip, the end of said tip having an axially disposed cavity defining the inner side face of a terminal rib adapted when the screw is turned home to upset the work metal and to thereby embed itself in the work, at least one side face of said rib being formed so as to provide a circumferential series of small channels intersecting the outer terminal edge of said rib and adapted to receive the said upset work metal to establish an interlock between the work and said tip, the peripheral portions of the tip separating said channels being substantially non-cutting with respect to the work.

6. A self-locking setscrew having a working tip of frusto-conical form, the outer tapered surface of said tip being knurled and thereby exhibiting a circumferential series of small projecting ribs and intervening recesses extending in a direction to intersect a cross sectional plane normal to the longitudinal axis of the screw, the tops of said ribs defining the peripheral surface of the tip and being substantially non-cutting with respect to the work, and the said knurls intersecting the outer terminal edge of said tip.

7. A self-locking setscrew having a frusto-conical working tip, the end of said tip having an axially disposed cavity having inwardly convergent walls defining the inner side face of a terminal rib adapted when the screw is turned home to upset the work metal and to thereby embed itself in the work, at least one side face of said rib being knurled and thereby exhibiting a circumferential series of ribs and recesses extending in a direction to intersect a cross sectional plane normal to the longitudinal axis of the screw, the tops of said ribs defining the outer peripheral surface of the tip and being substantially non-cutting with respect to the work, and said knurls intersecting the outer terminal edge of said rib.

8. A self-locking setscrew having an axially disposed cavity in the working tip, said cavity defining the inner side face of a terminal rib adapted when the screw is turned home to upset the work metal and to thereby embed itself in the work, one at least of the side faces of the rib being formed to provide therein a circumferential series of small channels arranged so as to intersect a plane normal to the longitudinal axis of the screw and adapted to receive the said upset work metal to establish an interlock between the work and said tip, the peripheral portions of the tip separating said channels being substantially non-cutting with respect to the work.

HOWARD T. HALLOWELL.